Feb. 11, 1947.  C. E. HILTABIDEL ET AL  2,415,742
FISHING LURE
Filed May 12, 1945
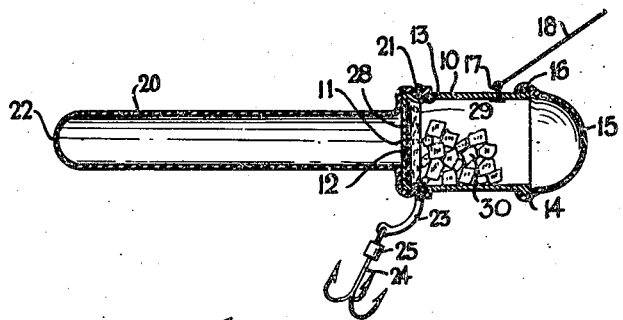
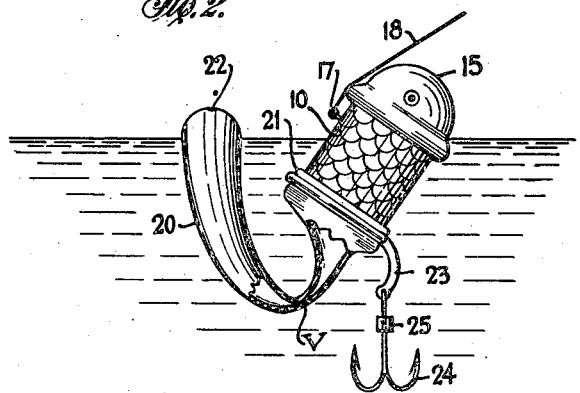
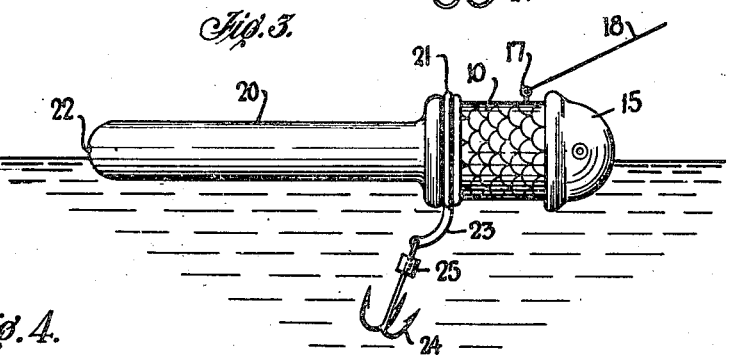
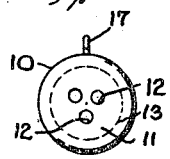
INVENTORS
CHARLES E. HILTABIDEL
AND
DAVID M. YODER
BY
ATTORNEYS Patented Feb. 11, 1947

2,415,742

UNITED STATES PATENT OFFICE 2,415,742

FISHING LURE

Charles E. Hiltabidel and David M. Yoder, Barberton, Ohio

Application May 12, 1945, Serial No. 593,452

9 Claims. (Cl. 43—42)

This invention relates to fishing lures or artificial bait such as are used by pole or fly-rod fishermen to attract and catch fish, and more especially it relates to fish lures characterized by automobility.

When fishing with rod and line it is common practice to employ lures or artificial bait that simulate the natural food of the fish being sought. It is well known that the efficiency and deceptiveness of a lure is increased by movements thereof which approximate the swimming movements of natural bait, or the struggles of a crippled bug or insect. Heretofore such movements of the lure usually have been induced by light jerks applied to the fish line by the fisherman, but in such cases disturbance of the water caused by the line itself detracts from the fidelity of the disturbance intended to be produced.

Accordingly it is the chief object of the invention to provide a fish lure having within itself the means for producing movement thereof. Other objects are to provide a fish lure of the character mentioned having movements that are spasmodic or intermittent; to provide a lure that may be used either for casting or for still fishing; to provide for easy replenishing of the motion-producing medium; and in general, to provide a fishing lure that will have greater attraction to fish whereby increased catches are obtained. Other objects will be manifest as the description proceeds.

Of the accompanying drawing:

Fig. 1 is a longitudinal diametric section of the improved lure;

Fig. 2 is a side elevation of the lure in one operative position thereof, a part thereof being broken away and in section;

Fig. 3 is a side elevation of the lure in another operative position thereof; and Fig. 4 is an end elevation of the hollow metallic body structure of the lure as viewed from the closed end thereof.

Referring to the drawing, there is shown a lure that comprises a hollow, cylindrical body 10 composed of rigid material of light weight, such as aluminum, or any suitable molded plastic. One end of the body 10 is closed by an integral end-wall 11 that has one or more apertures, such as the aperture 12, formed therein. Adjacent the end-wall 11, the body is formed with a circumferential groove 13. The opposite end of the body 10 is formed exteriorly with a circumferential bead 14, and is closed by a hollow cap 15 that, as shown, is of hemispherical shape. The cap 15 preferably is formed of elastic material, and has an internal marginal recess 16 in which the body-bead 14 is receivable so as removably to retain the cap on the body. A ring or eye 17 is attached to the body 10, at the end thereof adjacent the cap 15, to enable a fishing line 18 to be connected to the lure. If desired, the body 10 and cap 15 may be suitably embellished as shown so as to simulate to some extent the appearance of a fish.

Mounted upon the opposite end of the body 10 from the cap 15 is an elongate, hollow, flexible structure 20 of rubber that is very similar to some types of toy balloons. The structure 20 is of smaller diameter than the body 10, and is mounted on the latter by having an open end portion stretched over that end of the body 10 that includes the end-wall 11, the tension of the rubber drawing it into the circumferential groove 13 in the latter. A removable metal ring 21 is crimped upon the structure 20, coincident with the groove 13, to prevent separation of the rubber structure 20 from the body 10. The end of the structure 20 remote from the body 10 is formed with an aperture 22, the function of which presently will be explained. The ring 21 has an integral portion 23 that extends therefrom on that side of the lure that is diametrically opposite the eye 17, the end of said extending portion 23 being formed with an eye from which a hook 24 is suspended. As shown, the extension 23 curves rearwardly from the body 10, and the hook 24 has a small weight 25 thereon, but the weight may be attached to the extension 23 if desired. The arrangement is such that the center of gravity of the lure is at the rear of the body 10.

The body 10 and its cap 15 are sufficiently buoyant to float in water, the weight 25, however, tilting the body to the angular position shown in Fig. 2 when the rubber structure 20 is limp and uninflated. When the structure 20 is inflated, it imparts added buoyancy to the lure so that it assumes the horizontal position shown in Figs. 1 and 3, and it is this periodic change from tilted position to horizontal, and from horizontal to tilted, that simulates animation and thereby enhances the deceptiveness of the lure.

For inflating the rubber structure 20, a gas-producing material is enclosed within the body 10, the removability of the cap 15 facilitating the operation. For generating the gas, any suitable or available gas-producing material may be utilized. One such material is solidified carbon dioxide ($CO_2$), which material is a solid, and vaporizes without liquefying. It is sold under the trade name of "dry ice." Another material suitable for the purpose is calcium carbide ($CaC_2$). In the presence of water, calcium carbide gives off a gas known as acetylene, and a small amount of water should be placed within the body 10 where this medium is used.

If calcium carbide is to be used as the gas-producing agent, a wire screen 28 is employed within the body 10 against the end-wall 11 thereof so as to overlie the apertures 12 therein, and a thin layer of felt 29 is positioned against the screen, the rib formed on the interior of the body, as the result of the groove 13, serving to retain the screen and felt in place. The screen and felt prevent any of the particles of carbide from passing through the apertures 12, but do not prevent the generated gas from passing therethrough. The felt 29 also serves to retain the water that is employed with the carbide to generate the gas. A quantity of the granular calcium carbide is shown at 30, Fig. 1. If solidified carbon dioxide is employed as the gas-producing agent, the screen 28 and felt layer 29 may be dispensed with.

In operation, the fisherman fills the lure-body 10 with gas-producing material, replaces the cap 15, and then drops or casts the lure upon the water in the usual manner. For the reason previously pointed out, the lure initially assumes the tilted position shown in Fig. 2, the rubber structure 20 being bent upon itself as shown so that opposite sides thereof are in contact with each other in a local region of the structure adjacent the body 10. This region is indicated at V in Fig. 2 of the drawing, and constitutes, in effect, a valve that initially prevents the gas, generated in the body 10, from filling the rubber structure. However, as gas continues to generate and pressure is built up in the body 10 and in the rubber structure 20 on the inlet side of the valve V, said valve or fold is forced toward the free end of the rubber structure and the latter becomes filled with gas. As the structure 20 fills with gas it assumes its normal cylindrical shape, and its buoyancy increases so that the body 10 and structure 20 move into axial alignment, as shown in Figs. 1 and 3, and float in horizontal position upon the water. When the rubber structure becomes filled with gas, the valve V disappears, thereby enabling the gas quickly to escape by way of the aperture 22. Deflation of the structure 10 causes it to become limp and lose its buoyancy, with the result that the lure again assumes the tilted position shown in Fig. 2, the rubber structure flexing to recreate the valve V. This completes a cycle of operation of the device, which cycle automatically is repeated as long as any gas-producing material remains within the body 10. When said material is exhausted it is readily renewed in the manner hereinbefore described.

The intermittent tilting and straightening of the lure, simulates the struggles of a crippled fish or other creature. It attracts other fish by its realistic action, and results in larger catches for the fisherman. The improved lure is of simple construction, and achieves the other objects set out in the foregoing statement of objects.

Modification may be resorted to without departing from the spirit of the invention or the scope thereof as defined by the appended claims.

What is claimed is:

1. A fishing lure of the character described comprising a flexible structure, and means independent of any outside source and completely self-contained in the lure effecting intermittent flexing of said structure automatically while in the water.

2. A fishing lure of the character described comprising a rigid buoyant structure, a flexible structure connected therewith, and means independent of any outside source and completely self-contained in the lure automatically effecting periodic flexing of the flexible structure while in the water.

3. A fishing lure of the character described comprising a rigid buoyant body, a hollow flexible structure attached to one end thereof, said flexible structure being buoyant when filled with gas and lacking buoyancy when empty, and means for periodically filling said flexible structure with gas and periodically evacuating it therefrom.

4. A fishing lure of the character described comprising a hollow rigid buoyant body, a hollow flexible structure attached to one end thereof, means providing communication between the interiors of said body and flexible structure, gas generating means within said rigid body, and a vent in the hollow flexible structure remote from said body.

5. A fishing lure of the character described comprising a buoyant body, weight means attached to said body adapted to cause said body to float in a position whereof its axis is tilted out of horizontal, and self-contained means causing the lure intermittently to float with its axis in horizontal position.

6. In a fishing lure, the combination of a rigid buoyant body, weight means attached to one end thereof adapted to cause said body to float with its axis inclined with respect to horizontal, a hollow inflatable member carried by said body at the weighted end thereof adapted to increase the buoyancy of the lure so that it will float on a horizontal axis, and means for periodically inflating and deflating said member.

7. In a fishing lure, the combination of a hollow rigid buoyant body, weight means attached to one end thereof adapted to cause said body to float with its axis obliquely disposed with respect to horizontal, a hollow inflatable member carried by said body at the weighted end thereof adapted to increase the buoyancy of the lure so that it will float on a horizontal axis, means providing communication between the interior of the body and interior of the member, and gas generating material within the hollow body.

8. A combination as defined in claim 7 wherein the inflatable member is a flexible rubber structure which folds transversely when deflated due to the inclination of the body to which it is attached, said member formed with a vent at a point remote from the body to effect deflation of the member after the transverse fold has disappeared due to inflation of the member.

9. A combination as defined in claim 7 wherein an aperture in the body wall provides communication between the interiors of the body and member, and including a layer of pervious absorbent material in the body across said aperture through which gas may pass, and which retains fluid employed to generate the gas.

CHARLES E. HILTABIDEL.
DAVID M. YODER.

REFERENCES CITED

The following references are of record in the file of this patent:

UNITED STATES PATENTS

| Number | Name | Date |
|---|---|---|
| 726,020 | Bryan | April 21, 1903 |
| 1,888,221 | Coffin | Nov. 22, 1932 |